United States Patent [19]

Figini et al.

[11] Patent Number: 5,480,487
[45] Date of Patent: Jan. 2, 1996

[54] DISPENSING PROCESS PARTICULARLY FOR A SEALING/ADHESIVE PRODUCT

[75] Inventors: Aldo Figini, Dresano; Renato Beylis, Collegno, both of Italy

[73] Assignees: Loctite Corporation, Hartford, Conn.; NKE S.r.l., Turin, Italy

[21] Appl. No.: 962,224

[22] PCT Filed: Jul. 23, 1991

[86] PCT No.: PCT/EP91/01372

§ 371 Date: Jan. 26, 1993

§ 102(e) Date: Jan. 26, 1993

[87] PCT Pub. No.: WO92/02306

PCT Pub. Date: Feb. 20, 1992

[30] Foreign Application Priority Data

Jul. 27, 1990 [IT] Italy .................................. 21102/90

[51] Int. Cl.$^6$ .............................. B05C 11/10; F04B 43/12
[52] U.S. Cl. .......................... 118/610; 118/612; 222/152; 222/214; 222/252; 95/260; 96/194
[58] Field of Search ........................ 118/410, 610, 118/612, 50, 688; 427/207.1, 256; 222/152, 135, 189, 145, 214, 236, 252; 95/260; 96/194

[56] References Cited

U.S. PATENT DOCUMENTS

| | | | |
|---|---|---|---|
| 3,638,831 | 2/1972 | Pauwels et al. | 222/1 |
| 3,911,069 | 10/1975 | Fujita et al. | 264/23 |
| 4,257,562 | 3/1981 | Zini | 118/610 X |
| 4,380,308 | 4/1983 | Greenwood | 222/148 |
| 4,473,673 | 9/1984 | Williams et al. | 523/318 |
| 4,921,133 | 5/1990 | Roeser | 222/63 |

FOREIGN PATENT DOCUMENTS

| | | |
|---|---|---|
| 2159533 | 6/1973 | France . |
| 2595765 | 9/1987 | France . |
| 52-128935 | 10/1977 | Japan . |
| 1375237 | 11/1974 | United Kingdom . |

Primary Examiner—Michael W. Ball
Assistant Examiner—Francis J. Lorin
Attorney, Agent, or Firm—Edward K. Welch, II; Radhika P. Raju

[57] ABSTRACT

The invention relates to a dispensing process particularly for a sealing/adhesive product which comprises at least one step of pumping the sealing/adhesive product to allow a step of distribution thereof onto at least one part to be sealed, such as for example a motor vehicle mechanical component; an intermediate step of deaeration of the sealing/adhesive product, so as to optimize its distribution on the part to be sealed, is provided between the pumping step and the distribution step. The apparatus for dispensing the sealing/adhesive product (14) comprises elements (2) for feeding the sealing/adhesive product to elements (4) for distributing it onto at least one part (5) to be sealed and sealing/adhesive product deaeration means (3) which cooperate with the pumping and distribution elements for the uniform deposition of the sealant/adhesive on the part.

13 Claims, 3 Drawing Sheets

DISPENSING PROCESS PARTICULARLY FOR A SEALING/ADHESIVE PRODUCT

BACKGROUND OF THE INVENTION

The present invention relates to a dispensing process and apparatus particularly for a sealing/adhesive product.

As is known, the distribution of an adhesive or sealing/adhesive product on an item such as a mechanical part of a motor vehicle is currently performed manually or, in the most modern industries, by means of a robotized application.

In the first case, the problem which occurs arises, as well as from the need to use specialized personnel for this purpose, from the fact that the distribution of the adhesive or sealant/adhesive may not be performed uniformly and optimally, since it is subject to numerous variables which predominantly depend on the so-called "human factor."

In the second case, the problems which occur arise from the difficulty in distributing the adhesive or sealant/adhesive uniformly on the part, taking into account the numerous variables which determine a continuous variation in the viscosity of the product.

The greatest disadvantage of robotized application is the fact that the sealant/adhesive distributed on the part can frequently have one or more discontinuities essentially due to air bubbles. The reasons for which air bubbles are present in the sealing/adhesive product, which is for example of the anaerobic type, can be caused by the replacement of an empty can with a full one, a badly performed bleeding, or can be produced by an anomalous operation of the pumping system, or also, by the failure to signal the depletion of the product inside the can.

The bubbles which enter the circuit of the robotized system can, depending on the diameter of the tubes, on their length and on the deposited amount thereof, occur many times in different sizes and in successive moments during the distribution of the sealant/adhesive on the part. The consequent result is that the details executed, especially when sealing is required, are rejects.

It furthermore sometimes occurs that the bubbles are inside the already distributed sealant/adhesive, thus preventing an effective verification of the quality of the sealed product and producing harmful future consequences.

One thus observes an increase in costs and low production quality which is certainly not desired by manufacturers.

In order to at least partially obviate the disadvantage due to rejection, and more precisely to the temporary removal of the part from the production line, solutions have been tested in which a system for sensing the passage of air bubbles before the distribution of the product is adopted.

This sensing system stores the step of the robot's program in which the anomaly (air bubble) occurred and automatically returns to the portion where discontinuity in distribution occurred, restoring the missing product.

In this case the rejection of the part is eliminated, but on the other hand the sealing times are increased considerably, with a consequent slowing of the entire assembly line, especially in the field of motor vehicles, where the problem is most severely felt.

As can be easily imagined, the slowing and the increase in sealing times causes an increase in production costs which can even make the system as described above, which entailed the temporary removal of the defective part from the production line, more economical.

In this situation, the technical aim underlying the present invention is to solve the above described disadvantages of the known art.

Within the scope of this technical aim, an important object of the present invention is to provide a dispensing process and apparatus particularly for a sealing/adhesive product which eliminates the presence of air bubbles therein during the sealing of motor vehicle mechanical parts, such as gearshifts, engines and the like.

Another important object of the present invention is to provide a dispensing process and apparatus particularly for a sealing/adhesive product which eliminates the rejection of possible mechanical parts wherein the sealing is defective due to the presence of air bubbles and/or to avoid the restoring of the missing product with a subsequent pass.

Still another object of the present invention is to provide a dispensing process and apparatus particularly for a sealing/adhesive product which distributes an anaerobic sealant/adhesive with absolute precision and in a preset amount, independently of the variation of its chemical-physical characteristics.

Yet another object of the present invention is to provide a dispensing apparatus particularly for a sealing/adhesive product which has a high degree of reliability and therefore can operate in absolute safety on production lines without causing idle times due to possible problems and can furthermore be used with robots of different types according to the dimensions of the part to be sealed.

SUMMARY OF THE INVENTION

The aim of the invention and the specified objects are substantially achieved by a dispensing and deaerating apparatus particularly for a sealing/adhesive product, which performs the step of distribution thereof onto at least one part to be sealed, characterized in that it performs an intermediate step of deaeration of said sealing product.

The dispensing apparatus is particularly suited for a sealing/adhesive product, and comprises elements for pumping the sealing/adhesive product to elements for distributing it on at least one part to be sealed, characterized in that it comprises means for deaerating said sealing/adhesive product which cooperate with said elements for the pumping and distribution thereof for the uniform deposition of said sealant on said part.

Further characteristics and the advantages of the invention will become apparent with the description of a preferred but not exclusive embodiment of a dispensing process and apparatus particularly for a sealing/adhesive product according to the invention, illustrated only by way of non-limitative example in the accompanying drawings.

DESCRIPTION OF THE PREFERRED EMBODIMENTS

With reference to the above figures, the process according to the invention is executed by means of the following succession of steps.

A container of anaerobic sealing/adhesive product is initially prepared; if said container is of the flexible type, it advantageously contains a spacer for spacing its walls so as to facilitate its emptying when negative pressure is created in it.

In this step, the sealing/adhesive product is therefore conveyed from one or more containers to one or more deaerators to which the containers are connected.

The deaerators are suitable for performing a step of deaeration of the product, eliminating therefrom all the air bubbles contained therein.

Figure 2:
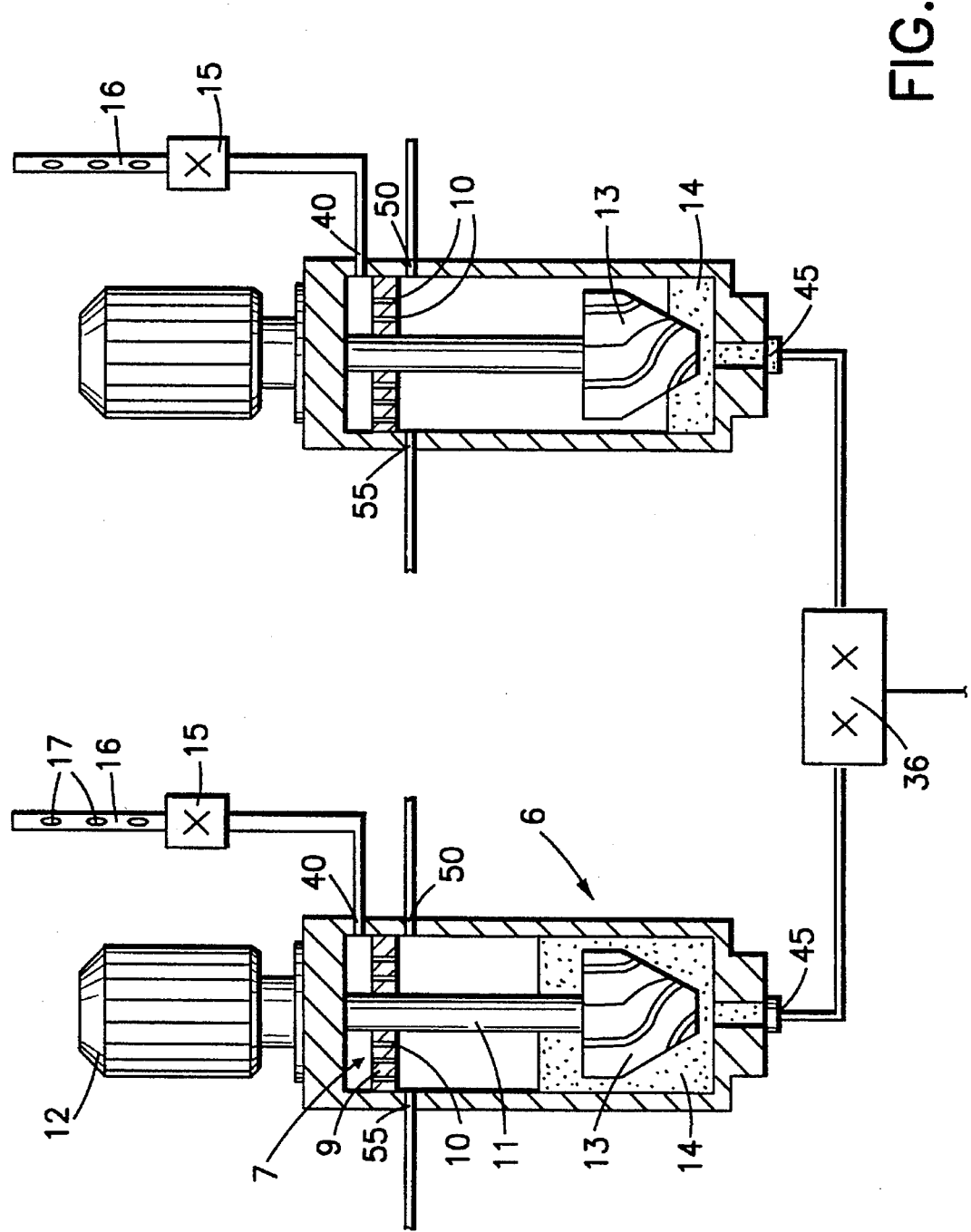
FIG. 2 is a view of how, according to the process with respect to FIG. 1, one deaerator is activated to feed the distributors of the sealant/adhesive when the other one is almost without product.
Figure 3:
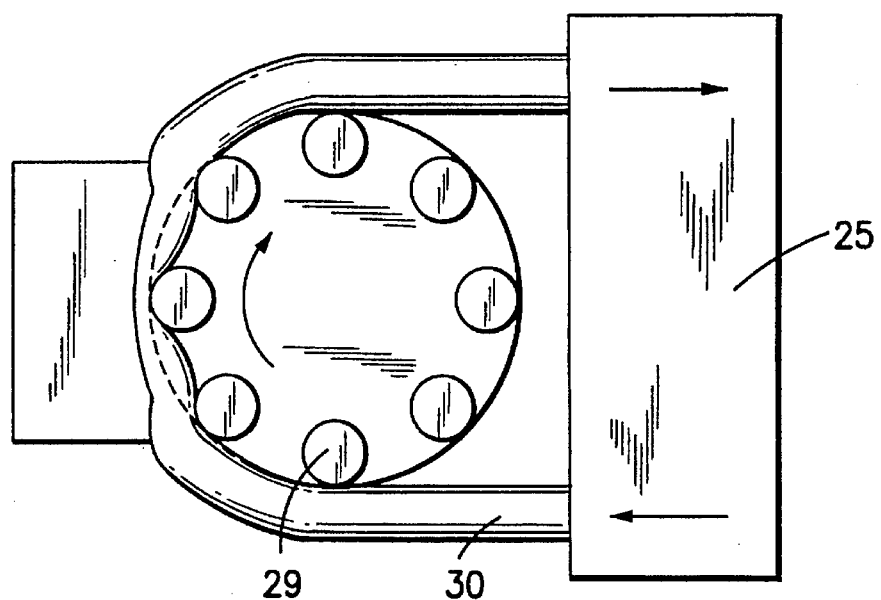
FIGS. 3 and 4 are a plan view and a lateral elevation view illustrating the peristaltic pump for the calibrated distribution of the sealant/adhesive product according to the invention.
Figure 4:
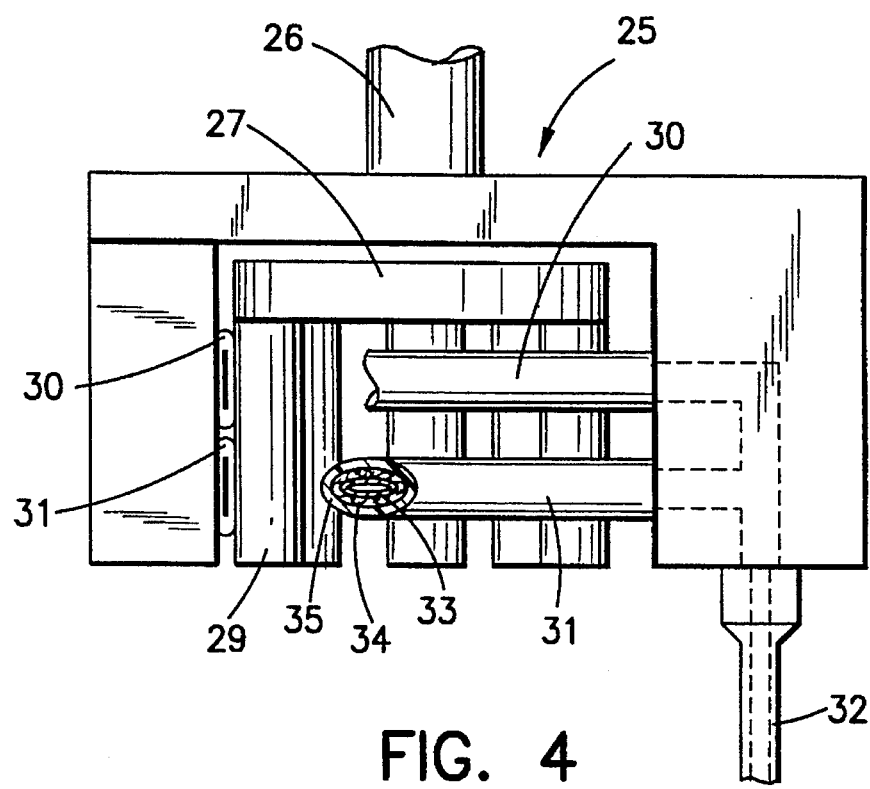

By way of example, with reference to FIG. 2, it can be seen that there can be two deaerators which are arranged mutually in parallel.

When the first deaerator has finished sending the sealing/adhesive product to the elements for distributing it, and has therefore been replaced in this operation by the second deaerator, vacuum is created in the chamber of the first deaerator.

The cutoff valve arranged between the first deaerator and the container which is associated therewith is then opened and the valve arranged after the second deaerator is simultaneously closed.

The step of actual deaeration of the anaerobic sealing/adhesive product begins at this point, while it is being transferred from its container to the deaerator by suction.

The deaeration step comprises a first step of straining the sealing/adhesive product, during which said product is passed through a plurality of small-diameter holes provided on the head of the deaerator, thus breaking and eliminating all the air bubbles possibly present in the sealing/adhesive product.

The strained product deposits, again in the presence of vacuum, on the bottom of the chamber of the deaerator, reaching a preset level which is determined by the closing of the valve between the first deaerator and the container.

During this step the deaerated product is constantly mixed and pushed toward the bottom and the outlet of the chamber.

At this point vacuum is removed from the chamber, and a preset pressure is restored; said pressure is suitable for beginning, as soon as the second deaerator is almost without product, the emptying of the chamber from the first deaerator, sending the sealing/adhesive product to the distribution elements with a certain preset pressure.

Essentially, by virtue of the synchronization of the opening and closing of the valves ahead of and after the two deaerators, while one deaerator performs the deaeration of the sealing/adhesive product the other deaerator sends the deaerated product to the distribution elements with a preset pressure, so as to have a continuous deaeration and feeding of the sealing/adhesive product to said distribution elements.

The distribution of the product occurs by acting peristaltically thereon but so as to distribute it continuously and with a constant flow-rate onto the part to be sealed or glued.

A consequence of the above is also that obviously the product is continuously and optimally distributed on the part to be sealed with the absolute assurance of the absence of air bubbles.

The elements for the distribution of the sealing/adhesive product are suitable for performing the step of distributing said product onto a part to be sealed continuously and at a preset speed according to the requirements.

The pressure exerted by each deaerator on the product is furthermore independent of the distribution speed of said product and of its viscosity and vice versa so as to always have a continuous feed of product to the distribution elements even if, due to reasons of dimensions or configuration of the part to be sealed, said speed is varied.

The deaeration and distribution steps are obviously controlled, selectively and in combination, by a numeric control system or by another kind of system capable of possibly varying, according to the configuration of the part to be sealed and to the chemical-physical characteristics of the anaerobic sealing/adhesive product, the pressure exerted thereon according to the distribution speed and to the viscosity of the product.

The above described process is provided by means of an apparatus which is also the subject of the present invention.

Figure 1:
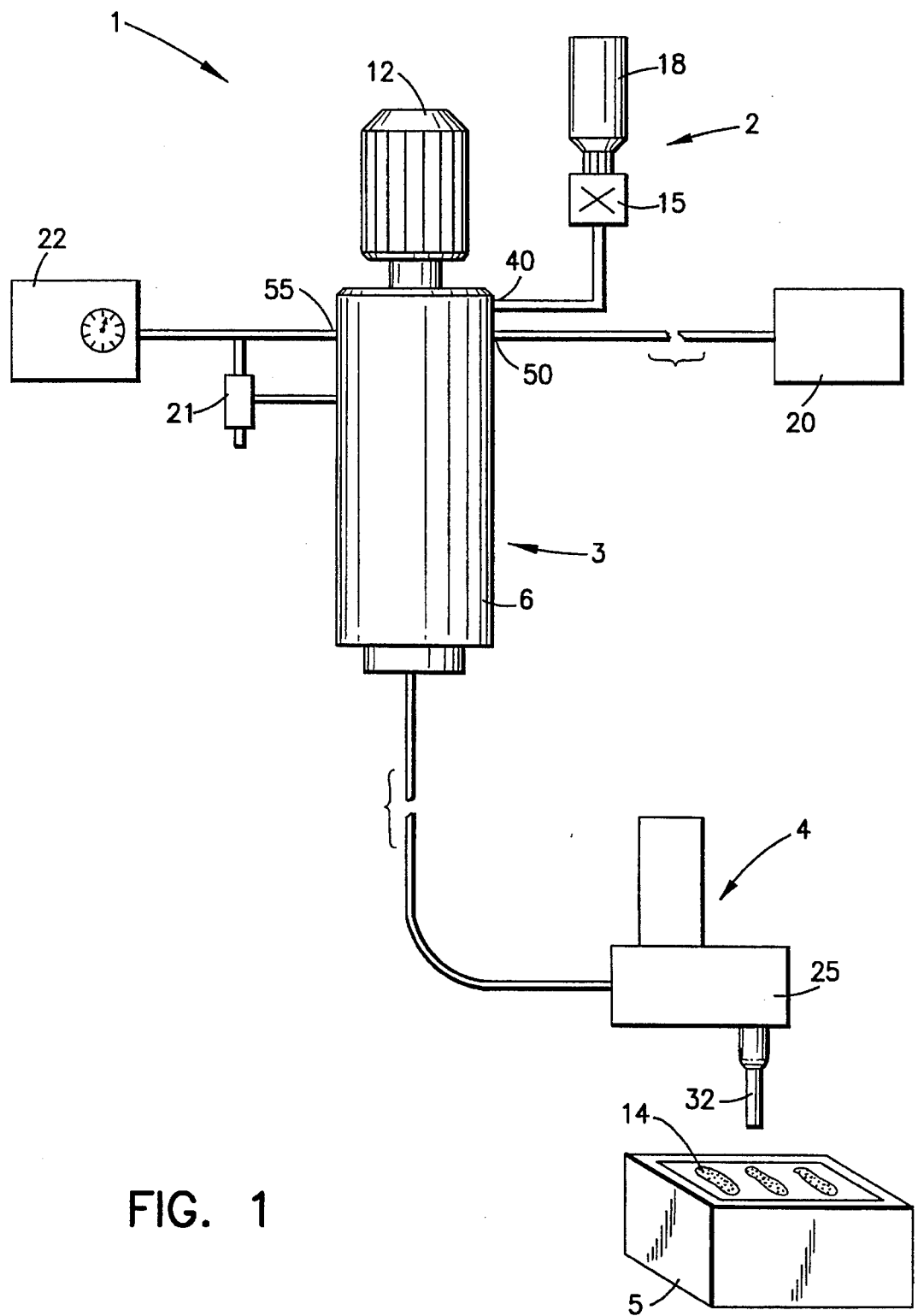
FIG. 1 is a schematic view of the apparatus according to the invention.

The dispensing apparatus particularly for a sealing/adhesive product, generally indicated by the reference numeral 1, is schematically illustrated in FIG. 1 and is illustrated in greater detail in its various parts in the subsequent figures.

The apparatus 1 comprises feeding elements, generally indicated by 2, for the sealing/adhesive product; said feeding elements are suitable for sending said product to means, generally indicated by 3, for deaerating the sealing/adhesive product.

In turn, the deaeration means 3 feed elements, generally indicated by 4, for distributing the sealing/adhesive product onto at least one part 5 to be sealed or glued.

More particularly, the deaeration means 3 comprise one or more deaeration devices, each of which has a chamber 6 which has means, indicated by 7, for straining the sealing/adhesive product; said means cooperate with means for forming vacuum inside said chamber 6, for example a pump 20, to achieve the deaeration of the sealing/adhesive product.

The straining means 7 are defined by a strainer 9 which has a plurality of holes 10 through which the product is strained so as to eliminate therefrom the possible presence of air bubbles.

The chamber 6 has an inlet 40 at the upper portion of the chamber above the straining means, two ports 50 and 55 below the straining means and an outlet 45 at the lower portion of the chamber. Inside the chamber 6 there are also means for agitating the sealing/adhesive product present therein and for conveying it in a preset direction.

The agitation and conveyance means are defined by a shaft 11 which extends inside the chamber 6 and is actuated outside said chamber by a known motor 12.

A plurality of vanes 13 are connected on the shaft 11 and have a configuration which is suitable for continuously mixing the adhesive/sealing product 14 contained inside the chamber 6 and for conveying it in a preset direction and in particular toward the bottom of the chamber 6 where the outlet 45 is located.

In this manner, if the adhesive/sealing product is rather viscous, the disadvantages of the forming of possible air pockets in said product when the preset pressure is restored in the chamber 6 to send the adhesive/sealing product to the distribution elements 4 are eliminated.

The sealing/adhesive product is introduced into the chamber 6 via the inlet 40, by virtue of the presence, on said chamber, of the feed means, and more precisely by virtue of the presence of a valve 15 with which a tubular body 16 is associated; said tubular body is provided with several openings 17, and the container 18 of the sealing/adhesive product must be fitted thereon.

In this manner, when vacuum is produced inside the chamber 6, by means of the known pump 20, the sealing/adhesive product contained in the container 18 is drawn into the chamber once the valve 15 has been opened.

If the container 18 is of the flexible type, its walls are kept spaced by the tubular body 16.

According to the dimensions of the deaerator and of the amount of sealing/adhesive product to be treated, in replacement of the pump 20, the vacuum in the chamber 6 can be provided for example with a Venturi tube 21 which is connected to the chamber 6 at one end and, at the other end, for example to a device 22 which is suitable for sending pressurized air into the Venturi tube.

The device 22 is furthermore already used to return into the chamber 6, after the forming of the vacuum and after the treatment of the sealing/adhesive product, pressurized air to ensure the transfer of the product from the chamber 6 to the distribution elements 4.

The distribution elements 4 comprise at least one peristaltic pump 25 which is provided with a rotating element 26 on the face 27 of which pins 29 are rotatably associated.

In this manner, the rotating element acts simultaneously, by means of the pins 29, on two pipes 30 and 31 for conveying the deaerated product to a single dispensing nozzle indicated by 32.

By virtue of the fact that the two pipes 30 and 31 are connected to the nozzle 32 in an offset arrangement (the pipe 31 is shorter than the pipe 30), it is possible to have a constant and uniform dispensing of the product from the nozzle 32 although a peristaltic pump is used to pump said product.

The offset arrangement of the two pipes 30 and 31 is in fact equal to half the wavelength of the peristaltic wave which flows in said pipes, so that the lack of dispensing of product from one pipe is compensated in the same moment by the dispensing of the flanking pipe, so as to have a continuous distribution of product through the nozzle 32.

So that the pipes 30 and 31 considerably withstand the compression and release action produced by the peristaltic pump, each pipe has a tubular core 33 made of elastomeric material, for example silicone, on which a first jacket of cross-ply fabric 34 and a second jacket of polymeric material, such as polyamide material like nylon, also of the cross-ply type and indicated by 35, are defined.

The second cross-ply nylon jacket is furthermore conveniently mixed with silicone to prevent sliding with respect to the first jacket and to the tubular core 33.

By virtue of what has been described above, the dispensing speed of the sealing/adhesive product from the nozzle 32 is independent of the viscosity of the product itself and of the preset pressure which is applied for the outflow of the product from the chamber 6.

The advantage of this independence allows, within reasonable limits, the distribution of the product from the nozzle 32 to be unaffected by the working temperature and by the pressure present in the chamber 6.

By way of example, if one considers two deaerators, although more may be present, when one deaerator performs the deaeration of the product the other one feeds said product to the distribution elements and vice versa.

The two deaerators are in a bypass configuration and the deaerator which is ready to feed the elements for the distribution of the sealing/adhesive product is automatically activated when the other one is almost without product.

More precisely, this operating synchronization of the deaerators, which allows to continuously feed deaerated sealing/adhesive product to the distribution elements, is obtained by providing, between the two deaerators, a cutoff valve 36.

At this stage it is also useful to remember that since the sealing/adhesive product is an anaerobic product, all the elements and the surfaces which are in contact therewith are advantageously made of a material which is inert with respect to said sealing/adhesive product, such as for example suitable plastic material or even active metallic material; i.e., a material which undergoes oxidation.

The operation of the apparatus according to the present invention is Known from what has been mentioned and described.

In particular, it can furthermore be noted that when the adhesive/sealing product is dispensed from a deaerator, for example the right deaerator in FIG. 2, the valve 36 is closed for the left deaerator.

Inside the left deaerator, vacuum is produced in the chamber 6 by means of the pump 20 or the Venturi tube 21.

The shaft 11 and therefore the vanes 13 simultaneously start to rotate.

Then the previously closed valve 15 is opened and the sealing/adhesive product is drawn from the container 18.

Upon entering the chamber 6, the product passes through the strainer 9 and in particular through the holes 10, which by breaking the air bubbles cause the deaeration of said product.

Once the product has been deposited on the bottom of the chamber 6, while the vanes 13 continue to rotate, a preset pressure is again produced inside the chamber 6 by means of the device 22.

At this point, by opening the valve 36 it is possible to close the flow of product arriving from the right deaerator to allow the left deaerator to feed the distribution elements 4.

As has been seen, the peristaltic pump will continue to continuously dispense the deaerated product in constant quantities onto the part to be sealed.

The invention thus achieves the intended aim and objects and achieves important and numerous advantages.

A new process and a new apparatus have in fact been devised for totally deaerating an anaerobic sealing/adhesive product so as to obtain so-called active control of the sealed parts, avoiding both the rejects due to air bubbles present in the sealant/adhesive and the downtimes for possible control of the quality of said parts.

Since the apparatus and the process according to the invention use time and volume as variable parameters, differently from known apparatuses and processes which use pressure and time as variable parameters, it is in fact possible to check all th elements of the apparatus before each working cycle, thus avoiding possible operating anomalies during the working cycle.

The invention thus conceived is susceptible to numerous modifications and variations, all of which are within the scope of the present inventive concept.

All the details may furthermore be replaced with technically equivalent elements.

The materials employed, the shapes and the dimensions may be any according to the requirements and to the state of the art.

Where technical features mentioned in any claim are followed by reference signs, those reference signs have been included for the sole purpose of increasing the intelligibility of the claims and accordingly such reference signs do not have any limiting effect on the scope of each element identified by way of example by such reference signs.

We claim:

1. An apparatus for batch deaerating and dispensing an anaerobic adhesive product comprising:
   (a) a deaerator comprising a chamber having an upper portion and a lower portion, with an inlet at the upper portion, an outlet at the lower portion, a strainer at the upper portion below the inlet and two ports below the strainer, providing deaerated adhesive product;
   (b) a feeding system which brings adhesive product into the chamber through the inlet;
   (c) a first cutoff valve connected at one end to the feeding system and at the other end to the inlet of the chamber to regulate the flow of the product into the chamber through the strainer;
   (d) a vacuum and pressurizing system comprising a vacuum pump connected to one of the ports of the chamber and a pressurizing device connected to the other port of the chamber;
   (e) a dispensing system which distributes the deaerated adhesive product onto a work piece;
   (f) a transporting system which carries deaerated product from the lower portion of the chamber through the outlet to the dispensing system; and
   (g) a second cutoff valve connected at one end to the transporting system and at the other end to the dispensing system, such that the flow of deaerated adhesive product from the deaerator can be stopped or started into the dispensing system.

2. The apparatus of claim 1 wherein inside the deaerator is a mixing system comprising a shaft extending from the upper portion of the chamber to the lower portion of the chamber, the shaft having at its lower portion a head with a plurality of vanes, the shaft actuated by a motor located outside the chamber to continuously mix the deaerated product and push the deaerated product to the lower portion of the chamber.

3. The apparatus of claim 1 wherein the feeding system comprises a tubular body with openings upon which a container of un-deaerated product is placed, a feeding tube connected to the tubular body at one end and the chamber at the other end and wherein the container of un-deaerated product is sealingly associated with the chamber, the product being fed into the chamber by the forming of a negative pressure.

4. The apparatus of claim 1 wherein the dispensing system includes at least one peristaltic pump which acts simultaneously on at least two pipes for the conveyance of the deaerated product to a single nozzle for dispensing the product onto the work piece and the two pipes are offset by an amount equal to the wavelength of the peristaltic wave which flows in the pipes, so as to have a constant and uniform dispensing of the product from the nozzle.

5. The apparatus of claim 1 wherein the dispensing speed is independent of the viscosity of the product and of the pressure in output from the chamber.

6. The apparatus of claim 1 wherein the vacuum system comprises a Venturi tube which is connected to one of the ports of the deaerator and to the pressurizing device 7. An apparatus for continuously deaerating and dispensing anaerobic adhesive product comprising:
   (a) two deaerators, each comprising a chamber having an upper portion and a lower portion, with an inlet at the upper portion, an outlet at the lower portion, a strainer at the upper portion below the inlet and two ports below the strainer, each dearator providing dearated adhesive product;
   (b) at least one feeding system which brings adhesive product into the chambers through the inlets;
   (c) at least one first cutoff valve connected at one end to the feeding system and at the other end to the inlets of the chambers to regulate the flow of the product into the chambers and through the strainers;
   (d) two vacuum and pressurizing systems, each system comprising a vacuum pump connected to one of the ports of one of the chambers and a pressurizing device connected to the other port of that chamber;
   (e) a dispensing system which distributes the deaerated adhesive product onto a work piece;
   (f) two transporting systems which carry deaerated product from the lower portion of each of the chambers through the outlets to the dispensing system;
   (g) at least one second cutoff valve which is connected at one end to the transporting systems and at the other end to the dispensing system, such that the flow of deaerated adhesive product from any one deaerator can be stopped at the same time that the flow from any other deaerator can be initiated;
the cutoff valves are synchronized and the deaerators work in parallel, operating in alternating cycles such that while one deaerator is performing the deaeration of the adhesive product, the other deaerator is sending deaerated product to the dispensing system, allowing for a continuous deaeration and feeding of deaerated product to the dispensing system.

8. The apparatus of claim 7 wherein inside each of the deaerators is a mixing system comprising a shaft extending from the upper portion of the chamber to the lower portion of the chamber, having at the lower portion a head with a plurality of vanes, the shaft being actuated by a motor located outside the chamber to continuously mix the deaerated product and to push the deaerated product into the lower portion of the chamber,

9. The apparatus of claim 7 wherein the feeding system comprises a tubular body with openings upon which a container of un-deaerated product is placed, two feeding tubes both tubes connected to the tubular body at one end and to one of the chambers at the other end and the first cutoff valve is capable of regulating which chamber the feeding system will feed product to and wherein the container of un-deaerated product is sealing associated with the chambers, the product being fed into the chambers by the forming of a negative pressure.

10. The apparatus of claim 9 wherein there are two feeding systems, each system comprising a tubular body with openings upon which a container of un-deaerated product is placed, a feeding tube connected to the tubular body at one end and to the inlet of the chamber at the other end.

11. The apparatus of claim 7 wherein the dispensing system includes at least one peristaltic pump which acts simultaneously on at least two pipes for the conveyance of the deaerated product to a single nozzle for dispensing the product onto the work piece, and the two pipes are offset by an amount equal to the wavelength of the peristaltic wave which flows in said pipes, so as to have a constant and uniform dispensing of the product from the nozzle.

12. The apparatus of claim 7 wherein the dispensing speed is independent of the viscosity of the product and of the pressure in output from the chambers.

13. The apparatus of claim 7 wherein each vacuum system comprises a Venturi tube which is connected to one of the ports of the deaerator and to the pressurizing device.

\* \* \* \* \*